(12) United States Patent
Mclaughlin et al.

(10) Patent No.: US 8,322,672 B2
(45) Date of Patent: *Dec. 4, 2012

(54) CONTAINER HOLDER

(75) Inventors: Ian Mclaughlin, Bloomfield, MI (US); Steve Norman Bazinski, Ontario (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/443,428

(22) Filed: Apr. 10, 2012

(65) Prior Publication Data

US 2012/0194052 A1 Aug. 2, 2012

Related U.S. Application Data

(63) Continuation of application No. 12/364,694, filed on Feb. 3, 2009, now Pat. No. 8,191,847.

(51) Int. Cl.
*A47K 1/08* (2006.01)

(52) U.S. Cl. ............... 248/311.2; 248/346.03; 220/551; 220/737; 296/37.8

(58) Field of Classification Search ......................... None
See application file for complete search history.

(56) References Cited

U.S. PATENT DOCUMENTS

| | | | |
|---|---|---|---|
| 4,270,781 A | 6/1981 | Nishimura | |
| 4,482,175 A | 11/1984 | Sugie | |
| 4,538,844 A | 9/1985 | Watanabe | |
| 4,660,871 A | 4/1987 | Arakawa et al. | |
| 4,760,987 A * | 8/1988 | Lan | 248/346.11 |
| 4,792,165 A | 12/1988 | Nishimura | |
| 4,941,635 A * | 7/1990 | Lan | 248/346.11 |
| 5,102,085 A | 4/1992 | Wieczorek et al. | |
| 5,285,953 A | 2/1994 | Smith | |
| 5,620,228 A | 4/1997 | Ito et al. | |
| 5,634,621 A | 6/1997 | Jankovic | |
| 6,019,334 A | 2/2000 | Shinomiya | |
| 6,585,210 B1 | 7/2003 | Lee | |
| 6,702,352 B2 | 3/2004 | Nakanishi et al. | |
| 6,796,591 B2 | 9/2004 | Yanagita | |
| 6,843,458 B1 | 1/2005 | Robinson et al. | |
| 7,341,297 B2 | 3/2008 | Nakamura et al. | |
| 7,520,405 B2 | 4/2009 | Ishida et al. | |
| 7,861,993 B2 * | 1/2011 | Hansen et al. | 248/311.2 |
| 2005/0248169 A1 | 11/2005 | Clark et al. | |
| 2006/0037984 A1 | 2/2006 | Misumi | |
| 2006/0278790 A1 | 12/2006 | Park | |
| 2007/0090256 A1* | 4/2007 | Hansen et al. | 248/311.2 |
| 2007/0278372 A1 | 12/2007 | Okada et al. | |

* cited by examiner

*Primary Examiner* — Bradley Duckworth
(74) *Attorney, Agent, or Firm* — Raymond L. Coppiellie; Price Heneveld LLP

(57) ABSTRACT

A container holder includes a cylindrical opening, having a side wall with a movable section which extends between a raised position, completing a cylindrical support for a container, and a lowered position providing a notch for receiving a handle of a cup. In one embodiment, a pair of adjacent cup holders are provided with a movable section extending between them. In a preferred embodiment, the movable section includes a push-push latch such that it can be pressed downwardly and remain in a retracted position for use with a handle-including container and, upon pushing a second time, is raised to accommodate a cylindrical container. In another embodiment, a damper mechanism is provided to control the motion of the movable section. In yet another embodiment of the invention, a peripheral seal near the movable section is provided to reduce or eliminate the effect of any fluid spilled on the control mechanism.

9 Claims, 4 Drawing Sheets

US 8,322,672 B2

CONTAINER HOLDER

CROSS-REFERENCE TO RELATED APPLICATIONS

This application is a continuation of U.S. patent application Ser. No. 12/364,694 entitled CONTAINER HOLDER, filed on Feb. 3, 2009, by Ian Mclaughlin et al., now U.S. Pat. No. 8,191,847, the entire disclosure of which is incorporated herein by reference.

FIELD OF THE INVENTION

The present invention relates to a container holder with a movable element for accommodating the handle of a cup or mug.

BACKGROUND OF THE INVENTION

Container holders have become a universal accessory in vehicles where they are frequently mounted in armrests between the front and rear seats, are retractably mounted from the instrument panel for access, or are mounted in a center console. They also have become a common accessory for use in lounge chairs or sofas, particularly those used for home theaters and other large comfortable seats with sufficiently wide arms to accommodate such container holders.

Consumers enjoy a variety of beverages during their daily activities, including cylindrical cans for holding soda pop and other beverages, generally tapered cylindrical cups for hot or cold beverages, and frequently coffee cups or other mugs with handles extending from the cylindrical side walls. Most container holders accommodate cylindrical containers, such as cans and glassware, and include variable diameter spring-loaded fingers which will also accommodate generally cylindrical tapered containers of varying diameters. They typically do not, however, include a cutout or notch for accommodating an outwardly extending handle of, for example, a coffee mug or other beverage container which includes a handle-like extension. Further, in the rare cases where a container holder does include a cutout, it does not support a generally cylindrical or tapered cylindrical container as well as a standard cylindrical container holder.

Accordingly, there is a need for a container holder which provides adequate support for cylindrical and tapered cylindrical containers as well as accommodate cups or mugs with outwardly extending handles and adequately support both such designs while providing ease of use by the consumer.

SUMMARY OF THE INVENTION

The present invention accommodates this need by providing a container holder which includes at least one generally downwardly extending cylindrical wall with a movable section which extends between a raised position, completing a cylindrical support for a cylindrical or tapered cylindrical container, and a lowered position providing a notch for receiving an extending handle of, for example, a coffee cup or mug. The movable section forms an arcuate section of the cylindrical wall and is positioned at a convenient location. In one embodiment, a pair of adjacent container holders are provided with a movable bridge section extending between them, such that a handled cup can be placed in either of the container holders. Such single or dual container holders can be integrally included in an armrest of a vehicle, a vehicle console, or in a chair or sofa used in the home environment.

In a preferred embodiment of the invention, the movable section is spring-loaded and includes a push-push latch such that it can be pressed downwardly and remain in a retracted position for use with a handle-including container and, upon pushing a second time, is raised to accommodate a cylindrical or tapered cylindrical container. In another preferred embodiment, a damper mechanism is provided to control the motion of the movable section. In yet another embodiment of the invention, a peripheral seal adjacent the movable section is provided to reduce or eliminate the effect any spilled fluid may have on the control mechanism.

These and other features, objects and advantages of the present invention will become apparent upon reading the following description thereof together with reference to the accompanying drawings.

DETAILED DESCRIPTION OF THE PREFERRED EMBODIMENT

Figure 1:
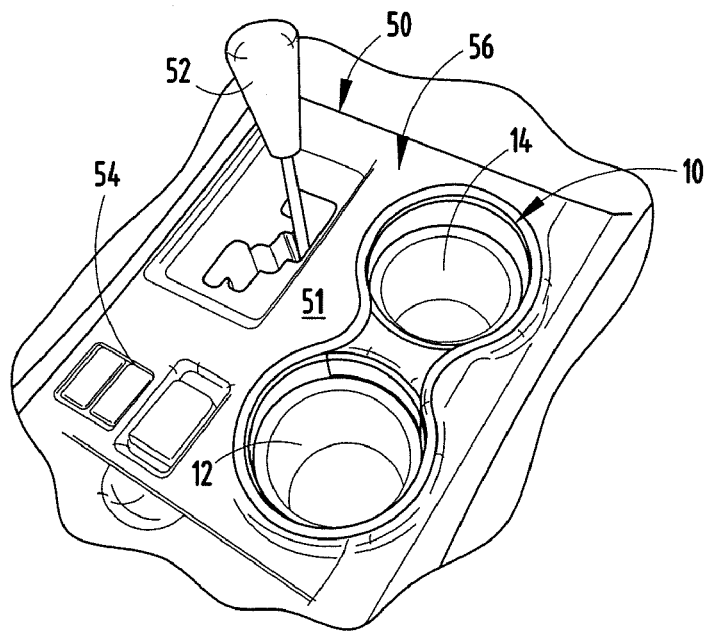
FIG. 1 is a perspective view of a dual container holder mounted within the console of a vehicle.
Figure 2:
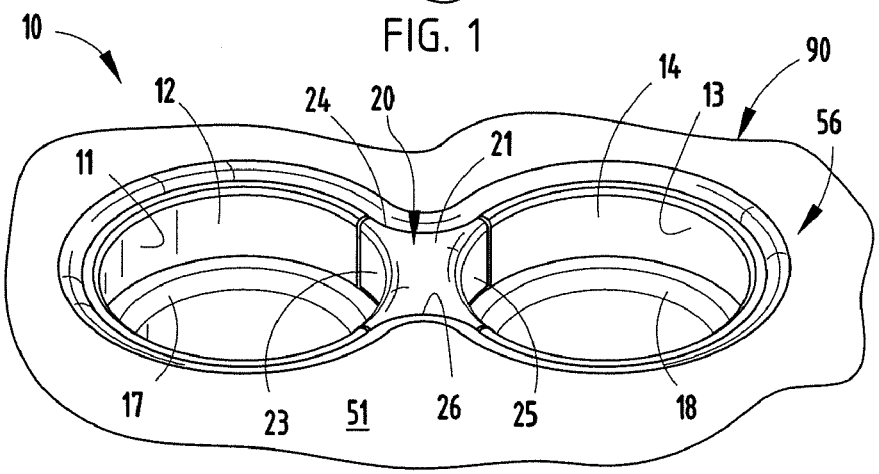
FIG. 2 is a perspective view of a container holder embodying the present invention mounted in one of a console, vehicle armrest, or chair armrest and shown in a first position.
Figure 3:
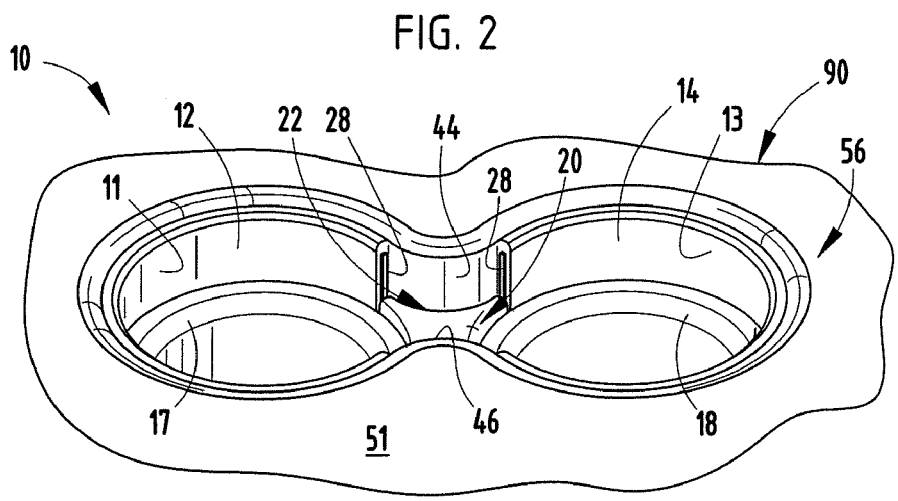
FIG. 3 is a perspective view of the container holder of FIG. 2, shown with the movable section in a second or lowered position.
Figure 4:
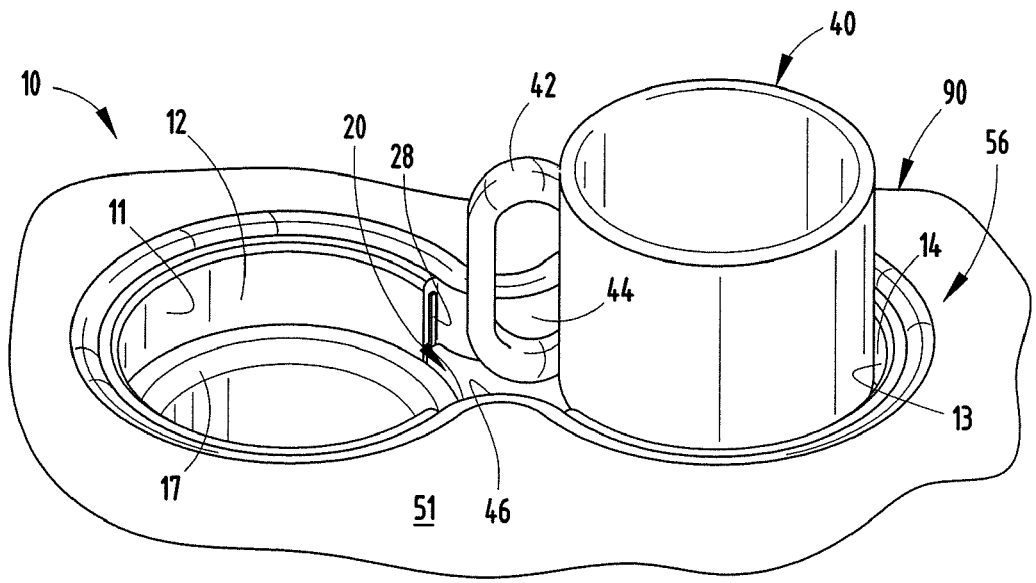
FIG. 4 is a perspective view of the container holder of FIG. 3, shown with a mug (in phantom) inserted therein.
Figure 5:
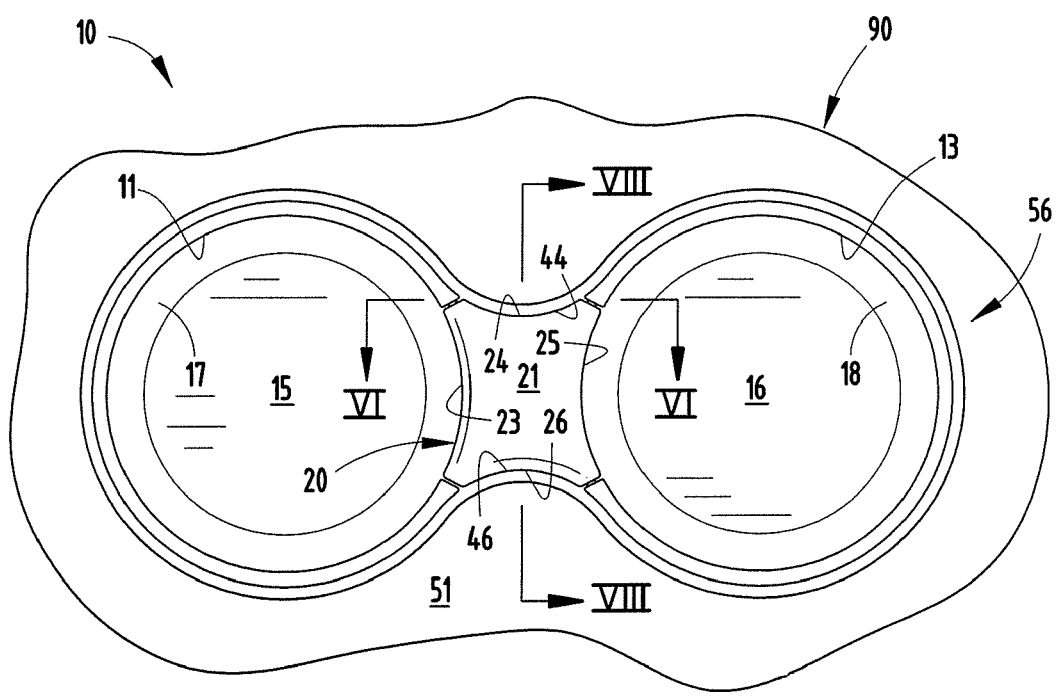
FIG. 5 is a top plan view of the container holder of the present invention.

FIG. 1 shows a dual container holder 10 embodying the present invention, which is shown in the environment of a vehicle console 50, including gear shift lever 52, various control switches 54, and a housing 56 into which the container holder 10 is mounted. The container holder likewise can be mounted, as shown in FIGS. 2-4, in any housing 56, including one in an armrest 90, which could be a vehicle armrest or an armrest of a chair or couch used in a house. Thus, the container holder 10 has universal application in any housing which conveniently locates a beverage near a user.

As seen in FIGS. 1-5, one embodiment of the container holder 10 is a dual container holder including a first section 12 and second section 14, both of which include generally cylindrical side walls 11 and 13, respectively, and floors 15 and 16, respectively. The container holders are separated by a movable section 20, which forms an arcuate section of the cylindrical side walls 11 and 13 when in a first raised position (as shown in FIG. 2) in which the upper surface 21 is substantially flush with the upper surface 51 of the armrest or console in which the container holder 10 is mounted. Movable section 20 can be moved to a second lowered position, as seen in FIGS. 3 and 4, to provide an open slot or notch 22 in which the handle 42 of a cup or mug 40 can extend to accommodate such a handle within either one of the container holder sections 12 and 14. Although the container holder is illustrated as a dual container holder in FIGS. 1-9, in some applications, a single container holder is provided, as shown in FIG. 10, and will include a movable section 20 to accommodate either a cylindrical container or one with a handle.

The cylindrical side walls 11, 13 of the container holders 12 and 14 may include gripper members that are either spring-loaded or otherwise flexible to grip the side of a cylindrical container, such as a can, glass, or the like, for securely holding cylindrical and tapered cylindrical containers of different diameters within the container holders in a secure manner. In the embodiment shown, rings 17 and 18 of resilient material are shown to provide such a function. In other embodiments, resilient flaps near the top of the container holders 12 and 14 or three or more spring-loaded arms extending from side walls 11 and 13 may be employed for such purpose. The movable section 20 serves as a retractable bridge between container holders 12 and 14. In some embodiments where a single container holder is employed as shown in FIG. 10, it will form an annular section of the cylindrical wall of such a container holder.

In a preferred embodiment, the movable section 20 comprises, as best seen. in FIGS. 6-9, a generally hollow molded polymeric member 20 with a top 21, vertically extending arcuate walls 23 and 25 (FIGS. 2 and 5-7) on opposite sides which conform to the radius of curvature of the cylindrical side walls 11, 13 of container holders 12, 14, respectively. Arcuate walls 24 and 26 (FIGS. 2 and 5) are integrally formed between walls 23 and 25 and have a radius of curvature which conforms to that of the fixed arcuate walls 55 and 57, respectively, of housings 56 or 90. Tabs 28 extend vertically and outwardly from cylindrical side walls 11 and 13 of container holders 12 and 14, respectively, near the opposite edges of the movable section 20 and extend into slots 27 (FIGS. 6 and 7) of movable section 20 to guide the movable section in its vertical motion between the raised position (shown in FIGS. 1 and 2) and a lowered position (shown in FIGS. 3 and 4). The container holder housing 56 also has arcuate walls 44 and 46 (FIGS. 8 and 9) which guidably and movably support sides 24 and 26 of movable section 20 as it is raised and lowered. The housing 56 also includes arcuate walls 63 and 65 (FIGS. 6 and 7) which are adjacent walls 23 and 25 of movable section 20. Thus, the somewhat rectangular movable section 20 with concave side walls 23-26 is captively and movably supported by the convex sidewalls 44, 46 and 63, 65 forming a part of the base or housing 56 of the container holder 10.

Figure 6:
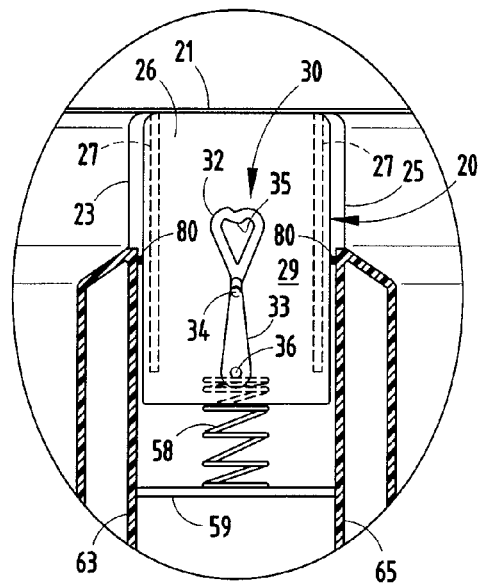
FIG. 6 is a cross-sectional view of the container holder taken along section line VI-VI of FIG. 5, shown with the movable section in a raised position as seen in FIG. 2.
Figure 8:
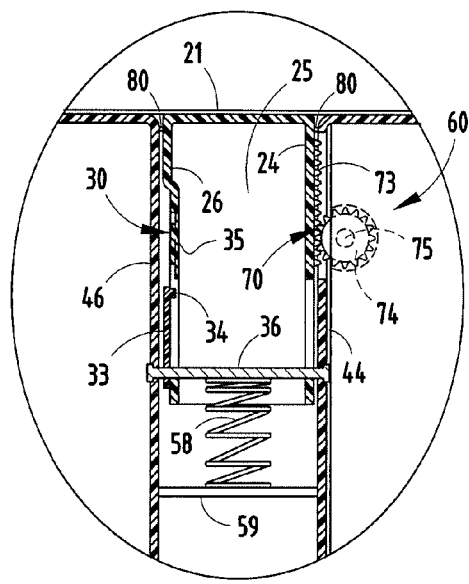
FIG. 8 is a cross-sectional view taken along section lines VIII-VIII of FIG. 5, showing the movable section in a raised position as seen in FIG. 2 and showing a damper mechanism.
Figure 7:
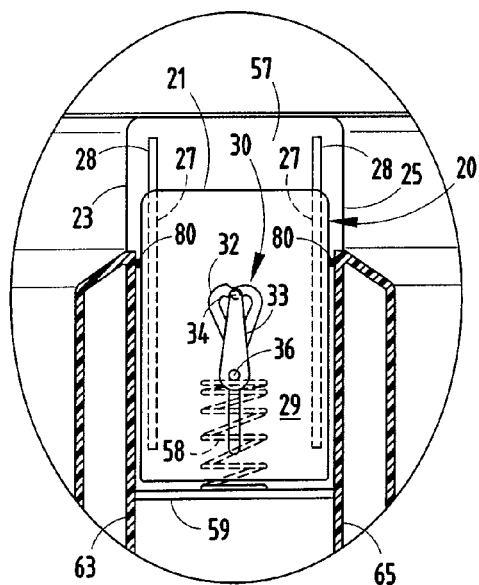
FIG. 7 is a vertical cross-sectional view taken along the same section line as FIG. 6, shown with the movable section in a lowered, latched position.

On the inner side 29 of wall 26 of the movable section 20, there is provided a push-push latch mechanism 30 of conventional design which includes a heart-shaped racetrack 32 and a follower pin 34 on pivot arm 33, which is pivotally mounted by cross pin 36 to the side walls 44 and 46 defining the notch 22 between container holders 12 and 14. A compression spring 58 extends between a floor 59 and cross pin 36, as best seen in FIGS. 6 and 8, and urges the movable section 20 toward an upward position, as shown in FIG. 6. When it is desired to lower the section 20 to accommodate a mug, as shown in FIGS. 3 and 4, the user depresses the upper surface 21 downwardly until pin 34 rides within one of the legs of the racetrack 32 and settles within the notch 35 of the heart-shaped racetrack, as shown in FIG. 7, to hold the retractable section 20 in a lowered position. This allows the handle 42 of a cup or mug to rest within the notch 22 adjacent either of the container holders 12 or 14. A second push-on top surface 21 of movable section 20 causes pin 34 to disengage notch 35 and ride down one of the legs of racetrack 32 to return to the position of FIGS. 1, 2, and 6 under the influence of spring 58. Latch 30 can be of the type described in U.S. Pat. No. 4,792,165, the disclosure of which is incorporated herein by reference.

Figure 9:
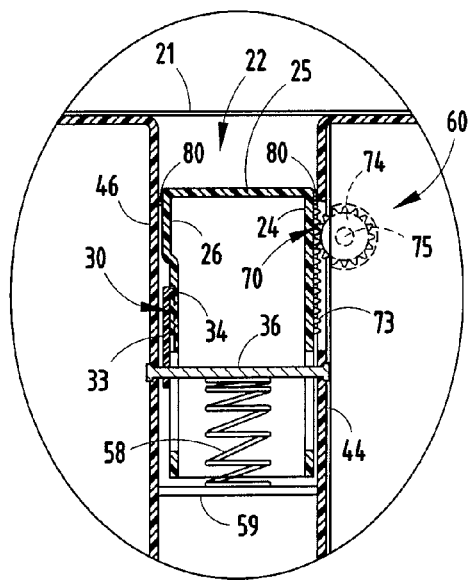
FIG. 9 is a vertical cross section in the same direction as FIG. 8, shown with the movable section in a lowered position.
Figure 10:
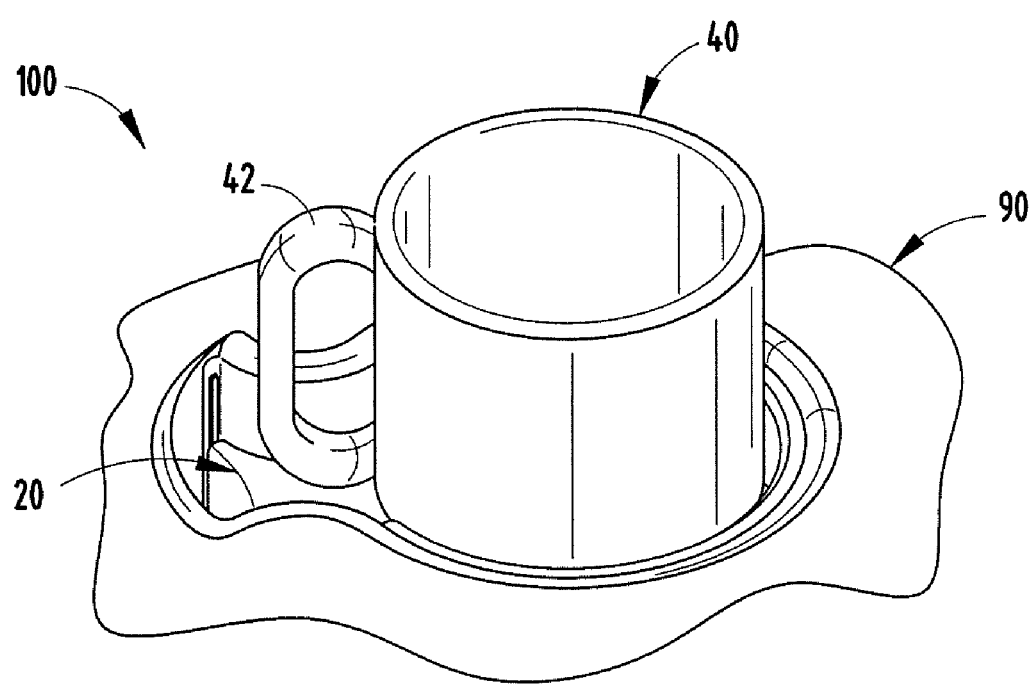
FIG. 10 is a perspective view of a single container holder embodying the present invention.

In addition to the push-push action provided by the latch mechanism 30, as seen in FIGS. 8 and 9, a damping mechanism is provided including a toothed ratchet wheel 74 rotatably mounted to the wall 44 of container holder 10. Mating teeth 73 are formed on the outer wall 24 of retractable member 20 having an opposed wall 26 adjacent the latch mechanism 30. The toothed wheel 74 has a viscous medium, such as a grease material, surrounding its axle 75 mounted to the container holder wall 44 and engages teeth 73, such that the motion of section 20 of the cup holder 10 is controlled between its lowered and raised positions, as seen in FIGS. 8 and 9, respectively.

Additionally, as seen in FIGS. 8 and 9, a sealing material 80 surrounds the curved side walls of the notch 22 of cup holder 10 to reduce or eliminate the admission of liquids from a container which may be inadvertently spilled in the container holders and interfere with the latch 30 or damper mechanism 70. Any suitable polymeric material, such as Santoprene® can be employed for such purpose and provides a lubricious interface between the movable section 20 and the adjacent fixed sides of container holders 12 and 14. Although in the preferred embodiment of the invention dual container holders 12 and 14 are shown, a single container holder 100, as shown in FIG. 10, may include a movable section 20 to allow any type of container to be held therein. Container holder 100 can have the same latch assembly 30 and damper mechanism 70 as described above and used in the prior embodiments. Likewise, different conventional push-push latching mechanisms can be employed for holding the movable section 20 in a raised and/or lowered use position. Also, the damper mechanism may or may not be necessary and can take on a variety of forms other than a wheel and ratchet combination as shown.

It will become apparent to those skilled in the art that various modifications to the preferred embodiment of the invention as described herein can be made without departing from the spirit or scope of the invention as defined by the appended claims.

The invention claimed is:

1. A container holder comprising:
   a receptacle having a floor and a cylindrical side wall including a vertically movable arcuate section movable between raised and lowered positions; and
   a latch for selectively holding said arcuate section in a lowered position to define a recess in said cylindrical wall of said receptacle for accommodating a handle of a cup and further including a seal extending between said arcuate section and said cylindrical side wall.

2. A container holder comprising:
   a housing for mounting in one of an armrest or console;
   a dual container holder including a pair of cylinders mounted within said housing in adjacent spaced relationship for receiving generally cylindrical containers therein, said cylinders including a notch extending between them with opposed vertically extending curved surfaces; and
   a sliding vertically movable section extending in said notch between said cylinders, said movable section having opposed vertically extending curved surfaces which slideably mate with said curved surfaces of said notch, said movable section further including concave side walls with a curvature conforming to that of said cylinders, wherein said section is vertically movable between a raised and a lowered position guided by said mating curved surfaces such that, only when in said lowered position, said notch between said cylinders is exposed to allow the admission of an outwardly protruding handle of a container.

3. A container holder comprising:
a housing for mounting in one of an armrest or console;
a dual container holder including a pair of cylinders mounted within said housing in adjacent spaced relationship for receiving generally cylindrical containers therein, said cylinders including a notch extending between them; and
a sliding vertically movable section extending in said notch between said cylinders, said movable section being vertically movable between a raised and a lowered position such that, when in said lowered position, said notch between said cylinders is exposed to allow the admission of an outwardly protruding handle of a container and further including a seal extending adjacent said movable section between said movable section and said housing.

4. The container holder as defined in claim 2 wherein said movable section includes a push-push latch including bias means for raising said movable section when said latch is released.

5. The container holder as defined in claim 4 wherein said bias means comprises a compression spring extending between said housing and said movable section.

6. The container holder as defined in claim 5 wherein said movable section includes a damper mechanism extending between said housing and said movable section for controlling the motion of said movable section.

7. The container holder as defined in claim 2 wherein said movable section has arcuate sides which conform to the curvature of said cylinders.

8. The container holder as defined in claim 2 wherein said cylindrical side wall has edges adjacent said movable section and further including guides extending vertically between said arcuate section and said edges to guide the motion of said arcuate section as it is lowered and raised.

9. A container holder for receiving a cup having a handle extending therefrom, said container holder comprising:
a receptacle having a cylindrical side wall which includes a notch formed therein, said notch having vertically extending edges with one of tabs or slots therein;
an arcuate section which is vertically movable in said notch and which has the other of tabs or slots which mate with said edges of said cylindrical side wall to provide guided vertical movement of said arcuate section between a raised position and a lowered position; and
said arcuate section includes a latch for selectively holding said arcuate section in a lowered position to expose said notch in said cylindrical wall of said receptacle for accommodating a handle of a cup and further including a seal extending between said arcuate section and said cylindrical side wall.

\* \* \* \* \*